United States Patent
Cellier et al.

(10) Patent No.: US 10,360,338 B2
(45) Date of Patent: Jul. 23, 2019

(54) METHOD FOR IMPROVING CAPACITANCE EXTRACTION PERFORMANCE BY APPROXIMATING THE EFFECT OF DISTANT SHAPES

(71) Applicant: INTERNATIONAL BUSINESS MACHINES CORPORATION, Armonk, NY (US)

(72) Inventors: Susan E. Cellier, Hopewell Junction, NY (US); Lewis W. Dewey, III, Wappingers Falls, NY (US); Anthony D. Hagin, Hopewell Junction, NY (US); Adam P. Matheny, Beacon, NY (US); Ron D. Rose, Essex Junction, VT (US); David J. Widiger, Pflugerville, TX (US); Patrick M. Williams, Salt Point, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 189 days.

(21) Appl. No.: 14/996,511

(22) Filed: Jan. 15, 2016

(65) Prior Publication Data
US 2017/0206299 A1 Jul. 20, 2017

(51) Int. Cl.
*G06F 17/50* (2006.01)

(52) U.S. Cl.
CPC ...... *G06F 17/5081* (2013.01); *G06F 17/5036* (2013.01); *G06F 17/5063* (2013.01);
(Continued)

(58) Field of Classification Search
None
See application file for complete search history.

(56) References Cited

U.S. PATENT DOCUMENTS 5,535,133 A * 7/1996 Petschauer .......... G06F 17/5036
361/774
5,706,206 A * 1/1998 Hammer ............. G06F 17/5081
716/115
(Continued)

OTHER PUBLICATIONS

A. Heldring et al., "Compressed Block-Decomosition Algorithm for Fast Capacitance Extraction," IEEE Trans. on Computer-Aided Design of Integrated Circuits and Systems, vol. 27, No. 2, Feb. 2008, pp. 265-271.*

(Continued)

*Primary Examiner* — Leigh M Garbowski
(74) *Attorney, Agent, or Firm* — Cantor Colburn LLP; Steven Meyers

(57) ABSTRACT

A computer-implemented method for extracting a capacitance for a target wire of an integrated circuit includes receiving a design of the integrated circuit having a plurality of wiring layers and selecting a target wire to perform the capacitance extraction. The method further includes determining a first adjacent wiring layer and a second adjacent wiring layer and removing a first subset and a second subset of a plurality of non-adjacent wiring layers from the plurality of wiring layers. The method includes approximating a first plate to be used in the extraction based on the first subset of the plurality of non-adjacent wiring layers and approximating a second plate to be used in the extraction based on the second subset of the plurality of non-adjacent wiring layers and performing the extraction of the target wire based on the first and second adjacent wiring layers and the first and second plates.

9 Claims, 7 Drawing Sheets

(52) U.S. Cl.
CPC ...... *G06F 17/5068* (2013.01); *G06F 17/5077* (2013.01); *G06F 2217/74* (2013.01); *G06F 2217/82* (2013.01)

(56) References Cited

U.S. PATENT DOCUMENTS

| | | | | |
|---|---|---|---|---|
| 5,761,080 | A * | 6/1998 | DeCamp | G06F 17/5081 706/921 |
| 5,831,870 | A * | 11/1998 | Folta | G06F 17/5081 716/115 |
| 5,838,582 | A * | 11/1998 | Mehrotra | G06F 17/5081 716/115 |
| 5,923,565 | A * | 7/1999 | Smith | G06F 17/5036 703/4 |
| 6,061,508 | A * | 5/2000 | Mehrotra | G06F 17/5036 716/113 |
| 6,086,238 | A * | 7/2000 | Mehrotra | G06F 17/5081 716/115 |
| 6,185,722 | B1 * | 2/2001 | Darden | G06F 17/5018 716/115 |
| 6,574,782 | B1 * | 6/2003 | Dewey, III | G06F 17/5036 716/115 |
| 6,854,099 | B2 | 2/2005 | Dewey, III et al. | |
| 7,596,771 | B2 * | 9/2009 | Cohen | G06F 17/5036 716/106 |
| 7,865,851 | B2 * | 1/2011 | Gurney | G06F 17/5036 716/100 |
| 8,429,577 | B2 * | 4/2013 | Li | G06F 17/5036 716/106 |
| 8,645,899 | B2 | 2/2014 | Widiger et al. | |
| 8,667,446 | B2 * | 3/2014 | Suaya | G06F 17/5036 716/126 |

OTHER PUBLICATIONS

Toulouse, et al., "Efficient 3D Modelling for Extraction of Interconnect apacitances in Deep Submicron Dense Layouts", Published in the Design, Automation, and Test in Europe Conference and Exhibition 1999 Proceedings, pp. 576-580/.

* cited by examiner

METHOD FOR IMPROVING CAPACITANCE EXTRACTION PERFORMANCE BY APPROXIMATING THE EFFECT OF DISTANT SHAPES

BACKGROUND

The present disclosure relates to the capacitance extraction and more specifically, to a method for improving capacitance extraction performance by approximating the effect of distant shapes.

Capacitance extraction is important to create reliable circuit designs in order to emulate actual digital and analog circuit responses. The data that is obtained from the extraction includes delay information, simulation data, and signal integrity data of the metal wires. When performing a typical extraction for a target wire all of the metal pieces within a three-dimensional region around the target wire are included in the computation. As the number of global interconnects increase in the design, the number of nets and shapes making up the nets will increase the number of design elements to be analyzed in the extraction. In addition, the variation of the shapes and interconnects adds complexity to the extraction analysis, which becomes very computer-intensive to process taking many hours to a few days to complete depending on the available resources and the desired accuracy. Parasitic capacitance must be considered when designing integrated circuits having multiple wiring layers to ensure the reliability and performance of the device.

SUMMARY

In accordance with an embodiment of the invention, a computer-implemented method for improving capacitance extraction performance by approximating the effect of distant shapes is provided. The method includes receiving a design of the integrated circuit having the plurality of wiring layers and selecting a target wire disposed on a target wiring layer from the plurality of wiring layers to perform capacitance extraction. The further includes determining a first adjacent wiring layer and a second adjacent wiring layer, wherein the first adjacent wiring layer is disposed on an opposing side of the target wiring layer from the second adjacent wiring layer and removing a first subset and a second subset of a plurality of non-adjacent wiring layers from the plurality of wiring layers, the first subset comprising one or more non-adjacent wiring layers disposed on a side of the target wiring layer that the first adjacent wiring layer is disposed on and the second subset comprising one or more non-adjacent wiring layers disposed on a side of the target wiring layer that the second adjacent wiring layer is disposed on. The method includes approximating a first plate to be used in the extraction based on the first subset of the plurality of non-adjacent wiring layers and approximating a second plate to be used in the extraction based on the second subset of the plurality of non-adjacent wiring layers and performing the extraction of the target wire based on the first and second adjacent wiring layers and the first and second plates.

In accordance with another embodiment of the invention, a processor system comprising a processor, computer implemented method for extracting a capacitance of an integrated circuit comprising a plurality of wiring layers including a least one of a plurality of wires on each plurality of wiring layers is provided. The system includes a memory and receives, by a processor, a design of the integrated circuit having the plurality of wiring layers. The system further selects a target wire disposed on a target wiring layer from the plurality of wiring layers to perform capacitance extraction and determines a first adjacent wiring layer and a second adjacent wiring layer, wherein the first adjacent wiring layer is disposed on an opposing side of the target wiring layer from the second adjacent wiring layer. The system further removes a first subset and a second subset of a plurality of non-adjacent wiring layers from the plurality of wiring layers, the first subset comprising one or more non-adjacent wiring layers disposed on a side of the target wiring layer that the first adjacent wiring layer is disposed on and the second subset comprising one or more non-adjacent wiring layers disposed on a side of the target wiring layer that the second adjacent wiring layer is disposed on and approximates a first plate to be used in the extraction based on the first subset of the plurality of non-adjacent wiring layers and approximating a second plate to be used in the extraction based on the second subset of the plurality of non-adjacent wiring layers. The system performs the extraction of the target wire based on the first and second adjacent wiring layers and the first and second plates.

In accordance with another embodiment of the invention, a device for extracting a capacitance of an integrated circuit comprising a plurality of wiring layers including a least one of a plurality of wires on each plurality of wiring layers is provided. The device includes a memory coupled to a processor and an interface, wherein the interface receives a design of the integrated circuit having the plurality of wiring layers. The device further includes selecting, by the processor, a target wire disposed on a target wiring layer from the plurality of wiring layers to perform capacitance extraction and determining a first adjacent wiring layer and a second adjacent wiring layer, wherein the first adjacent wiring layer is disposed on an opposing side of the target wiring layer from the second adjacent wiring layer. The device includes removing a first subset and a second subset of a plurality of non-adjacent wiring layers from the plurality of wiring layers, the first subset comprising one or more non-adjacent wiring layers disposed on a side of the target wiring layer that the first adjacent wiring layer is disposed on and the second subset comprising one or more non-adjacent wiring layers disposed on a side of the target wiring layer that the second adjacent wiring layer is disposed on and approximating a first plate to be used in the extraction based on the first subset of the plurality of non-adjacent wiring layers and approximating a second plate to be used in the extraction based on the second subset of the plurality of non-adjacent wiring layers. The device further includes performing the extraction of the target wire based on the first and second adjacent wiring layers and the first and second plates.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, a method and system for performing capacitance extraction of a target shape by reducing the complexity of the computation while maintaining accuracy are provided. In some embodiments the wires that are modeled in the integrated circuit design may be metal lines, interconnects, shapes, polygons, etc. In some embodiments the complexity of the integrated circuit model is reduced by considering shapes one layer above and below a target wiring layer while assuming a plate at the wiring layers two layers above and below the target wiring layer when analyzing the integrated circuit. In other embodiments, multiple refinement methods to increase the accuracy of the extraction are performed based on the cross-wiring density between the wiring layers and/or the parallel layout of the integrated circuit are provided. In another embodiment, the analysis for the wiring layers are performed independently of other wiring layers during the extraction of the target wire. In other embodiments the various techniques and refinement techniques can be performed simultaneously during the extraction. The provided techniques reduce the overall computation without sacrificing the accuracy of the results of the extraction.

Figure 1:
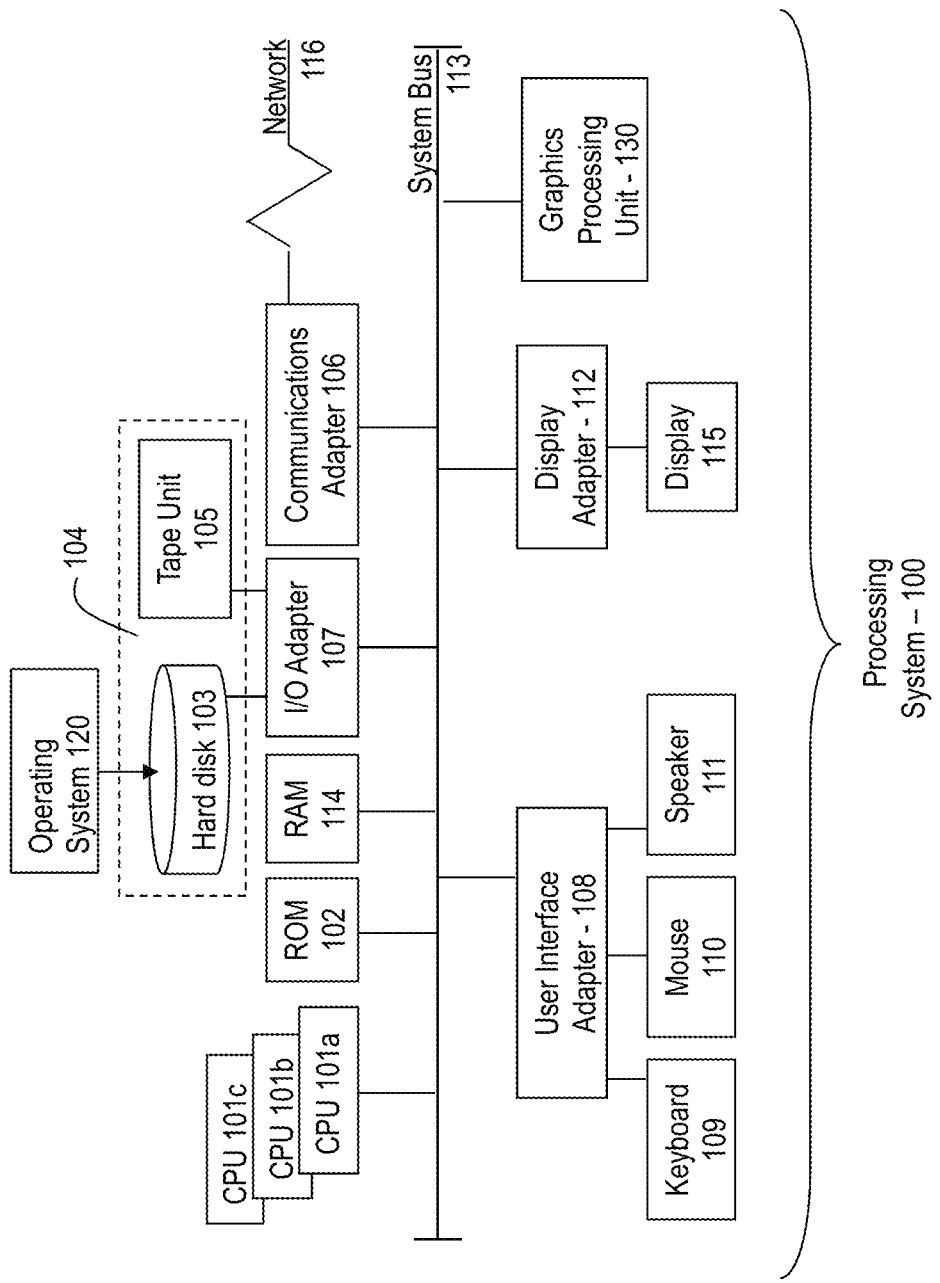
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
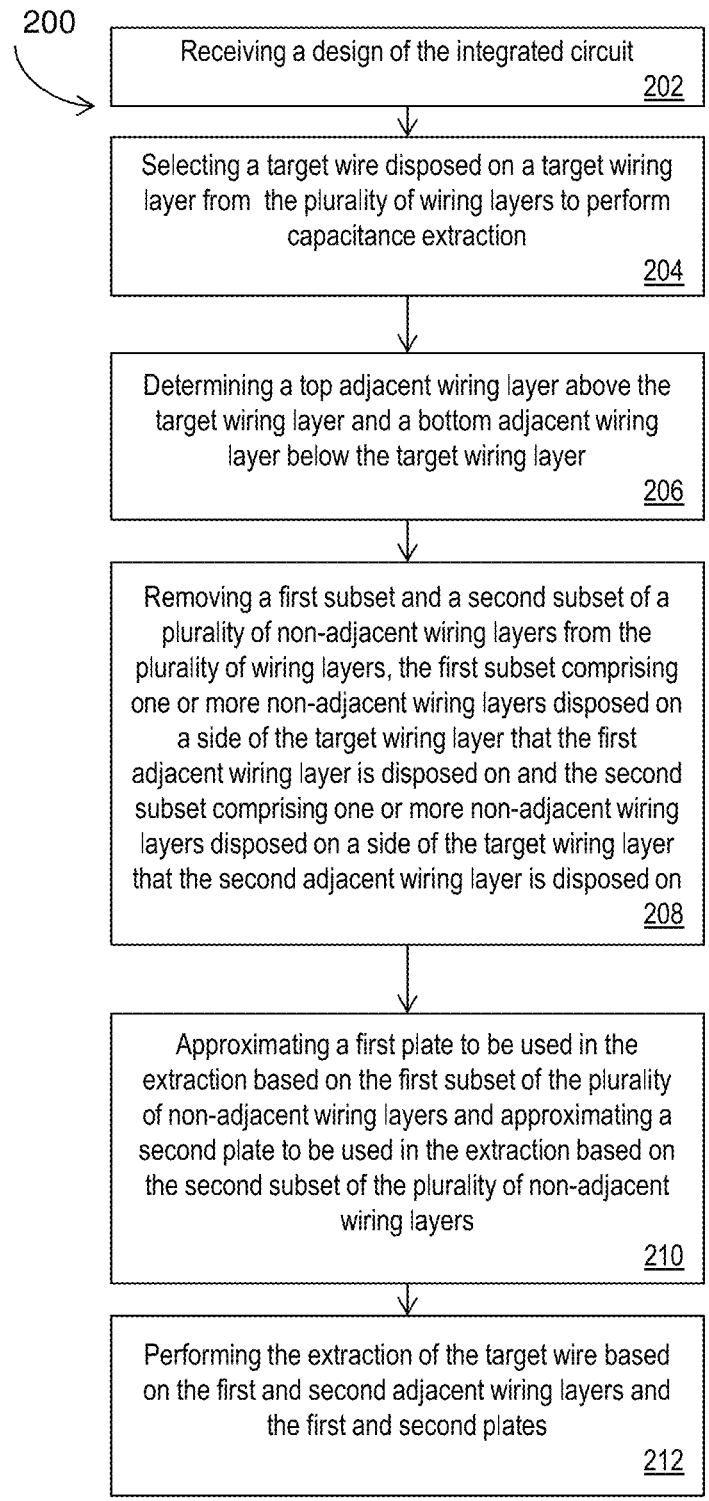
FIG. 2 is a flow diagram for improving capacitance extraction performance by approximating the effect of distant shapes in accordance with an embodiment.

Referring now to FIG. 2, a flow diagram of method 200 for improving capacitance extraction performance by approximating the effect of distant shapes is shown. Block 202 shows the method 200 receiving a design of the integrated circuit having the plurality of wiring layers. In an exemplary embodiment the layout of the circuit design is evaluated prior to performing extraction of the target wire. Block 204 provides selecting a target wire disposed on a target wiring layer from the plurality of wiring layers to perform capacitance extraction and block 206 shows determining a first adjacent wiring layer and a second adjacent wiring layer, wherein the first adjacent wiring layer is disposed on an opposing side of the target wiring layer from the second adjacent wiring layer. The first and second adjacent wiring layers are adjacent to the target wiring layer. As shown in block 208, the method 200 includes removing a first subset and a second subset of a plurality of non-adjacent wiring layers from the plurality of wiring layers, the first subset comprising one or more non-adjacent wiring layers disposed on a side of the target wiring layer that the first adjacent wiring layer is disposed on and the second subset comprising one or more non-adjacent wiring layers disposed on a side of the target wiring layer that the second adjacent wiring layer is disposed on. Non-adjacent wiring layers are wiring layers that are not adjacent to the target wiring layers. In essence the wiring layers that are two levels above the target wiring layer are removed and the wiring layers that are two levels below the wiring layer are removed. The removed wiring layers are not included in the extraction computation. Block 210 further illustrates approximating a first plate to be used in the extraction based on the first subset of the plurality of non-adjacent wiring layers and approximating a second plate to be used in the extraction based on the second subset of the plurality of non-adjacent wiring layers. In an exemplary embodiment there may exist a plurality of wiring layers above and below the target wiring layer. The plates that are approximated for the extraction are approximated to represent the plurality of layers that are two levels above and below the target wiring layer. This approximation reduces the complexity in the extraction and in turn reduces the processing time. Block 212 shows performing the extraction of the target wire based on the first and second adjacent wiring layers and the first and second plates.

The cross-wiring density of the integrated circuits between the wiring layers can affect the results of the extraction and vary from one design to the other. In an exemplary embodiment the cross-wiring density can be determined between the target wiring layers and the adjacent wiring layers to invoke a refinement method based on the determined cross-wiring density. If a dense cross-wiring density is determined, there is no need to invoke the refinement method because the adjacent wiring layers will screen out coupling effects beyond these layers. However when a sparse cross-wiring density is determined coupling effects beyond the adjacent wiring layers may influence the extraction for the target wire.

Figure 3:
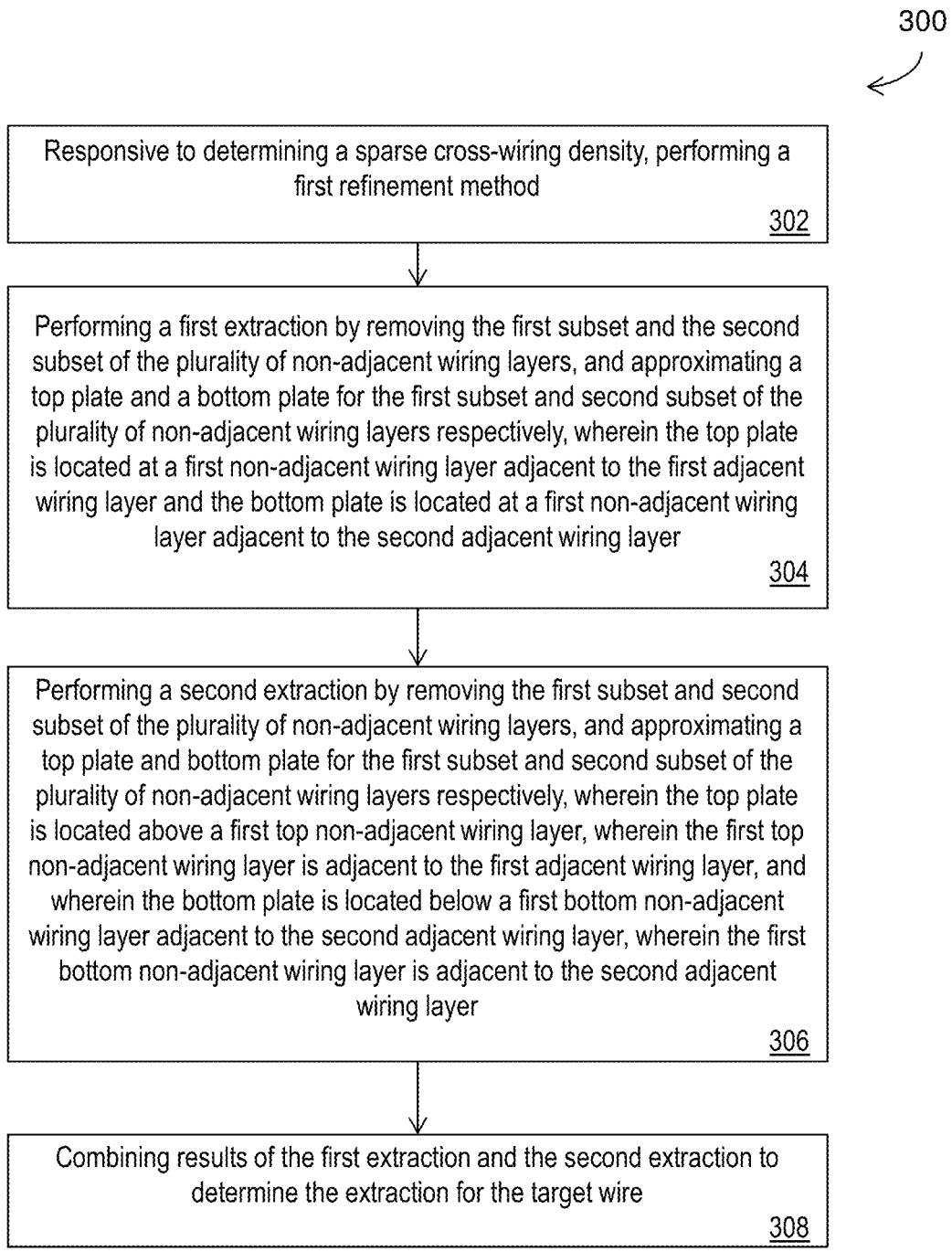
FIG. 3 is a flow diagram for improving capacitance extraction performance by approximating the effect of distant shapes in accordance with another embodiment.

Referring now to FIG. 3, a flow diagram for another method 300 for improving capacitance extraction performance by approximating the effect of distant shapes is shown. After determining a cross-wiring density between the target wiring layer and the adjacent wiring layers, block 302 shows responsive to determining a sparse cross-wiring density, performing a first refinement method. As shown in block 304, the method 300 includes performing a first extraction by removing the first subset and the second subset of the plurality of non-adjacent wiring layers, and approximating a top plate and a bottom plate for the first subset and second subset of the plurality of non-adjacent wiring layers respectively, wherein the top plate is located at a first non-adjacent wiring layer adjacent to the first adjacent wiring layer and the bottom plate is located at a first non-adjacent wiring layer adjacent to the second adjacent wiring layer.

Block 306 includes performing a second extraction by removing the first subset and second subset of the plurality of non-adjacent wiring layers, and approximating a top plate and bottom plate for the first subset and second subset of the plurality of non-adjacent wiring layers respectively, wherein the top plate is located above a first top non-adjacent wiring layer, wherein the first top non-adjacent wiring layer is adjacent to the first adjacent wiring layer, and wherein the bottom plate is located below a first bottom non-adjacent wiring layer adjacent to the second adjacent wiring layer, wherein the first bottom non-adjacent wiring layer is adjacent to the second adjacent wiring layer. Essentially the bottom and top plates are approximated and are located in the wiring layers that are two wiring layers above and below the target wiring layer.

As shown in block 308, the method 300 includes combining results of the first extraction and the second extraction to determine the extraction for the target wire. In this refinement method 300 two cases are considered for determining the extraction. The first and second case both remove the wiring layers that are two layers above and below the target wiring layer while the wiring layers that are immediately above and below the target wiring layer remain in the computation. The difference between the first and the second case is the location of the top and bottom plates during the extraction. In the first case the top and bottom plates are located in the wiring layers that are three wiring layers above and below the target wiring layer which leaves an empty wiring layer on the layers that are two wiring layers above and below the target wiring layer. In the second case, there are no empty wiring layers two layers above and below the target wiring layer, as the top and bottom plates are located in those wiring layers during the extraction. Finally after performing the first and second cases for extraction the results are combined to determine the improved capacitance. In some embodiments, a combination of the analysis for the first and second cases are based on various wiring layer densities, where the particular analysis used may be determined empirically based on a pre-analysis of various wiring layer configurations.

Figure 4:
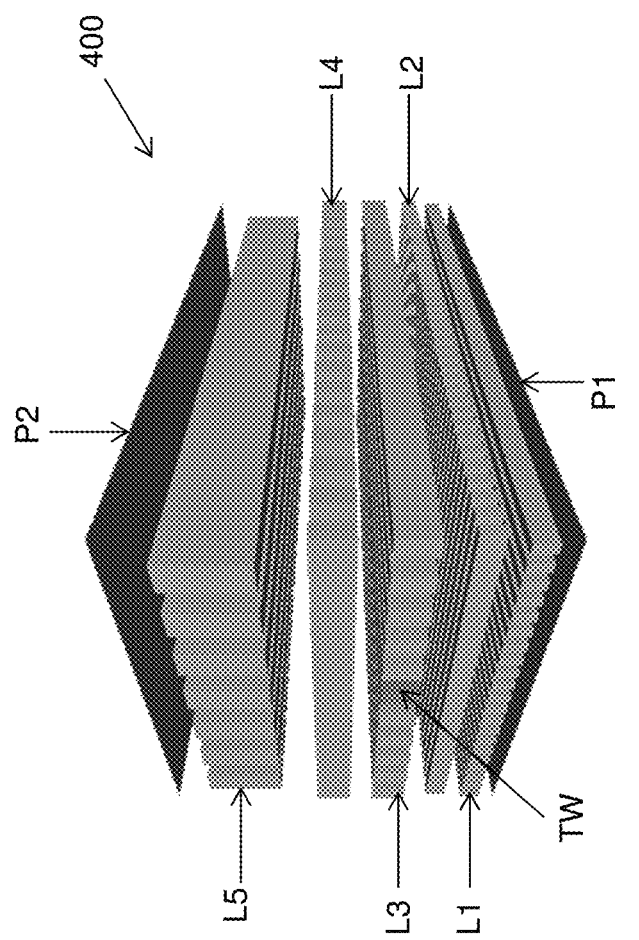
FIG. 4 is a block diagram of a model an integrated circuit in accordance with an embodiment.

FIG. 4 depicts an integrated circuit model 400 having a plurality of wiring layers including a plurality of wires on each wiring layer. The target wire TW selected for extraction is in the wiring layer L3. Wiring layer L3 is also referred to as the target wiring layer because it includes the target wire TW. Adjacent wiring layers are wiring layers that are adjacent to the target wiring layer L3 and are immediately above and/or below the target wiring layer. The wiring layer L4 is a first adjacent wiring layer and the wiring layer L2 is a second adjacent wiring layer. Non-adjacent wiring layers are wiring layers that are not immediately adjacent to the target wiring layer L3. In this example, there are shown two non-adjacent wiring layers L1 and L5, however in other examples there may be a plurality of non-adjacent wiring layers in the design where the plurality of non-adjacent wiring layers are a subset of the plurality of wiring layers. A first non-adjacent wiring layer is a wiring layer that is next to (adjacent) an adjacent wiring layer. In this example wiring layers L1 and L5 are first non-adjacent wiring layers, where wiring layer L1 is a first bottom non-adjacent wiring layer and L5 is a first top non-adjacent wiring layer. FIG. 4 further depicts metal plates P1 and P2, where plate P1 is a bottom plate located below wiring layer L1 and plate P2 is a top plate located above wiring layer L5.

Figure 5:
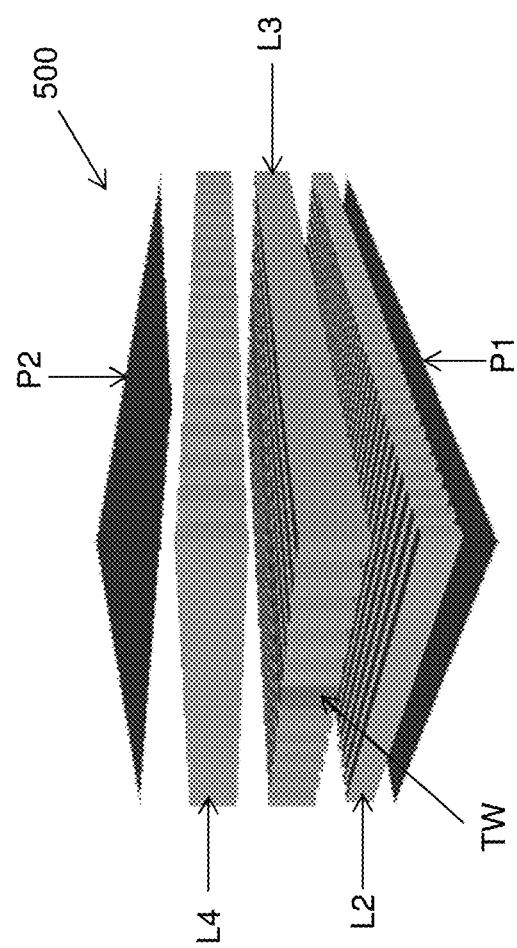
FIG. 5 is a block diagram for improving the capacitance extraction performance by approximating the effect of distant shapes in accordance with another embodiment.

FIG. 5 depicts an extraction performed in accordance with an exemplary embodiment of the invention. The extraction in this exemplary embodiment is performed on the integrated circuit shown in FIG. 4. The target wire TW is selected for capacitance extraction from wiring layer L3 (target wiring layer). FIG. 5 illustrates the non-adjacent wiring layers L1 and L5 are removed. In essence the wiring layers located two layers away from the target wiring layer L3 are removed from the computation. The bottom plate P1 has been approximated for non-adjacent wiring layer L1 and is included in the extraction. Similarly the top plate P2 has been approximated for non-adjacent wiring layer L5 and is also included in the extraction. In other embodiments, a plurality of top and/or bottom non-adjacent wiring layers may exist in the integrated circuit design to be extracted. The plurality of top and/or bottom non-adjacent wiring layers can be removed and approximated as the top and bottom plates respectively to reduce the complexity of the computation. In an exemplary embodiment, the bottom plate P1 and top plate P2 are located below bottom adjacent layer L2 and above top adjacent layer L4, respectively. In this particular embodiment plates P1 and P2 are located in wiring layers L1 and L5 respectively, after those wiring layers have been removed. The extraction is performed on the model 500 shown in FIG. 5 including adjacent wiring layers L2 and L4 and further including plates P1 and P2.

As previously mentioned, the cross-wiring density of the integrated circuits between the wiring layers can affect the results of the extraction. Referring to FIG. 4, the cross-wiring densities are discussed as an example. The two wiring layers L1, L2 below the target wiring layer L3 are more dense as they contain more wires than the target wiring layer L3. The two wiring layers L4, L5 above the target wiring have less number of wires when compared to the layers L1, L2. FIG. 4 is shown as a non-limiting example the wiring layers may have various densities.

Figure 6A:
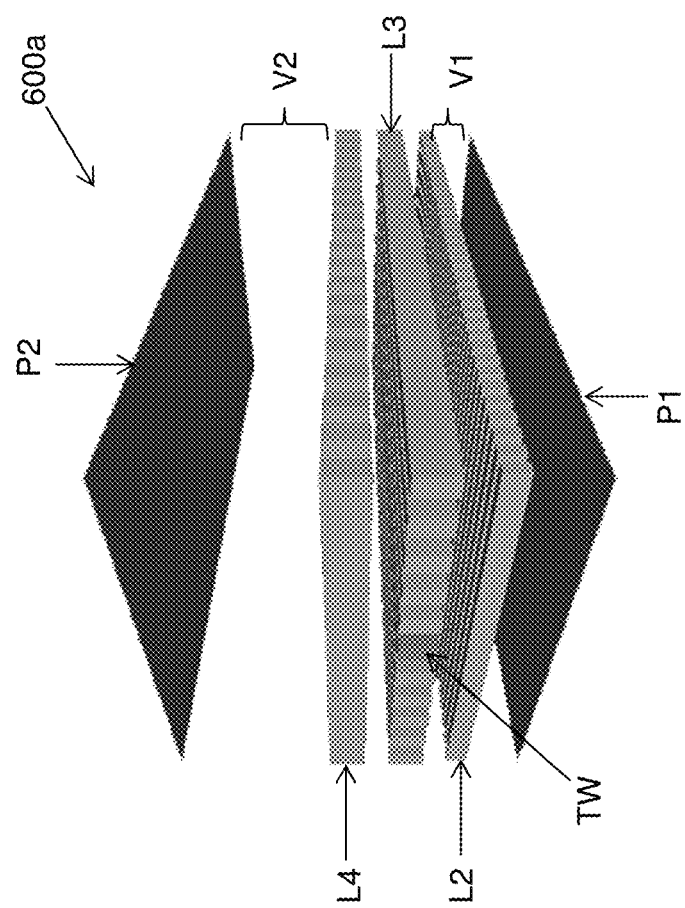
FIGS. 6a and 6b are block diagrams illustrating further embodiments for improving capacitance extraction performance by approximating the effect of distant shapes.
Figure 6B:
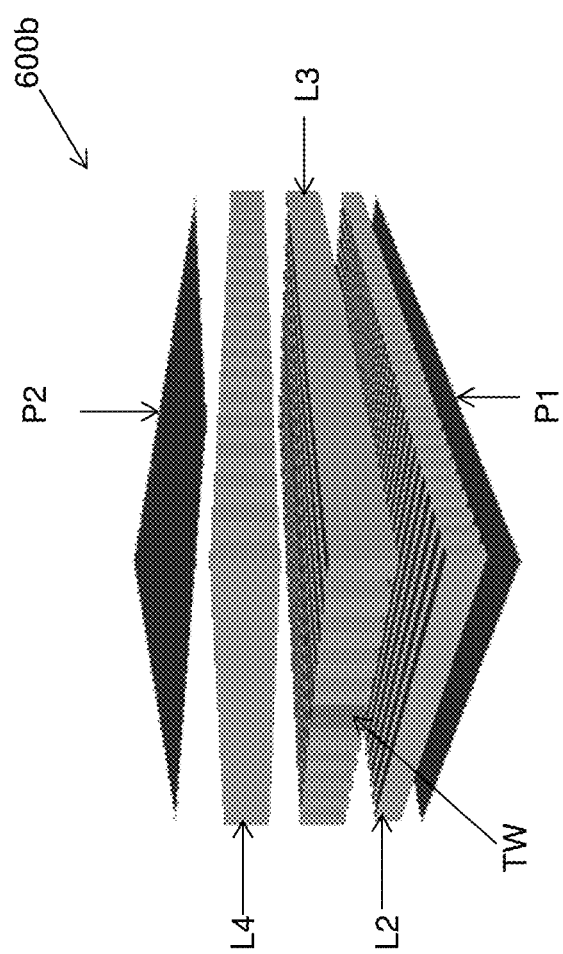

FIG. 6a and FIG. 6b illustrate the first and second cases that are performed for the extraction of target TW to account for a sparse cross-wiring density having been determined. This technique is referred to as a refinement method where FIG. 6a depicts the first analysis 600a and FIG. 6b depicts the second analysis 600b. FIG. 4 is an example of the model integrated circuit used to perform extraction where target wire TW is selected from the wiring layer L3 for analysis. In an exemplary embodiment, the target wire may be selected from any wiring layer. After selecting the target wire TW, the cross-wiring density between the target wiring layer L3 and the first adjacent wiring layer L4 is evaluated. Similarly, the cross-wiring density between the target wiring layer L3 and second adjacent wiring layer L2 is evaluated. In an exemplary embodiment, if a dense cross-wiring density is determined the extraction is performed in accordance with FIG. 5. If a sparse cross-wiring density is determined the refinement method is applied and the first and second cases are executed.

During the first case 600a, non-adjacent wiring layers L1 and L5 have been removed from the extraction and bottom and top plates P1 and P2 have been approximated for the respective bottom and top non-adjacent wiring layers. In other embodiments the bottom plate P1 may approximate a plurality of bottom non-adjacent layers, and the top plate P2 may approximate a plurality of top non-adjacent wiring layers. FIG. 6a shows that in the first case of the refinement method the plates P1 and P2 remain below and above wiring layers L1 and L5 respectively during the extraction. Because layers L1 and L5 have been removed there are vacant wiring layers V1 and V2 as shown in FIG. 6a. The extraction for the first case is performed with the configuration shown in FIG. 6a and the results are ascertained from the analysis.

The second case 600b of the refinement method is shown in FIG. 6b. This second case is similar to the extraction performed in FIG. 5. Using the same target wire TW as selected in FIG. 6a, extraction is performed by removing non-adjacent wiring layers L1 and L5 and approximating the plates P1 and P2. In contrast to FIG. 6a, the plates P1 and P2 of FIG. 6b are located at wiring layers L1 and L5 respectively and the extraction is performed. FIG. 6b does not include any vacant wiring layers between the plates and the adjacent wiring layers. Finally the results of first case and the second case are combined to determine the overall extraction according to the refinement method.

In the above example, the cross-wiring densities were assumed to be sparse between the target wiring layer and both first and second adjacent wiring layers. In further embodiments the cross-wiring densities between the target wiring layer and the first and second adjacent wiring layers may be independent of one another. In an exemplary embodiment the cross-wiring layer between target wiring layer L3 and second adjacent wiring layer L2 may be determined to be dense and while the cross-wiring density between target layer L3 and first adjacent wiring layer L4 is determined to be sparse. In this non-limiting example, the refinement method including the two different analyses may be performed for the target layer L3 and first adjacent layer L4 while the analysis for the target layer L3 and second adjacent layer will undergo the single analysis of extraction as shown in FIG. 5. The extraction for the wiring layers above and below the target wiring layer are independent of one another. A cross-wiring density threshold can be configured to determine a sparse and dense topology for the model.

A second refinement method apportions the capacitance to the metal plates two levels above and below the actual (parallel) wires on that wiring level based on the distance wires to the target wire. Adjusting the values of the capacitance based on common run length and the amount of crossing wires in-between increases the accuracy of the capacitance. An apportionment algorithm scales the capacitance based on the width of the parallel wires and on the log of the direct distance from the target wire to the parallel wire. Each parallel wire within a lateral range receives a weight based on its width and distance, and the capacitance from the target wire to the associated plate would be divided among these parallel wires based on their weight. This apportionment algorithm is one example of an apportionment algorithm with an aspect of the invention. One of ordinary skill in the art will appreciate that other apportionment techniques can be used.

In an exemplary embodiment, the cost of performing multiple capacitance analyses can be voided by performing them simultaneously, taking advantage of vector-like analysis. For example, if tabular lookup is used to determine the various capacitances, the table can includes additional values for the additional capacitance analyses. Scaling the density can be performed in a fashion similar to 2.5D analyses, except the density would be on the layers two away from the target and would be based on a lateral range of the typically parallel wires on these levels.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A computer-implemented method for extracting a capacitance of an integrated circuit comprising a plurality of wiring layers including a plurality of wires on each of the plurality of wiring layers, the method comprising:
   receiving, by a processor, a design of the integrated circuit having the plurality of wiring layers;
   selecting, by the processor, a target wire disposed on a target wiring layer from the plurality of wiring layers to perform capacitance extraction;
   determining, by the processor, a first adjacent wiring layer and a second adjacent wiring layer, wherein the first adjacent wiring layer is disposed on a first side of the target wiring layer and the second adjacent wiring layer is disposed on a second side of the target wiring layer;
   removing, by the processor, a first subset and a second subset of a plurality of non-adjacent wiring layers from the plurality of wiring layers to determine one or more vacant wiring layers, the first subset comprising one or more non-adjacent wiring layers disposed on the first side of the target wiring layer that the first adjacent wiring layer is disposed on and the second subset comprising one or more non-adjacent wiring layers disposed on the second side of the target wiring layer that the second adjacent wiring layer is disposed on;
   approximating, by the processor, a first plate to be used in the extraction based on the first subset of the plurality of non-adjacent wiring layers and approximating a second plate to be used in the extraction based on the second subset of the plurality of non-adjacent wiring layers; and
   performing, by the processor, the extraction of the target wire based on the first and second adjacent wiring layers and the first and second plates;
   wherein performing the extraction includes determining a cross-wiring density between the target wiring layer and the first adjacent wiring layer and between the target wiring layer and the second adjacent wiring layer, wherein at least one of the plurality of non-adjacent wiring layers is approximated as a plate based on the cross-wiring density;
   determining the cross-wiring density is below a density threshold;
   performing a refinement method based at least in part on determining the cross-wiring density is below the threshold, wherein the refinement method comprises:
      performing a first extraction by removing the first subset and the second subset of the plurality of non-adjacent wiring layers, and approximating a top plate and a bottom plate for the first subset and second subset of the plurality of non-adjacent wiring layers respectively, wherein the top plate is located at a first non-adjacent wiring layer adjacent to the first adjacent wiring layer and the bottom plate is located at a first non-adjacent wiring layer adjacent to the second adjacent wiring layer;

performing a second extraction by removing the first subset and second subset of the plurality of non-adjacent wiring layers, and approximating a top plate and bottom plate for the first subset and second subset of the plurality of non-adjacent wiring layers respectively, wherein the top plate is located above a first top non-adjacent wiring layer, wherein the first top non-adjacent wiring layer is adjacent to the first adjacent wiring layer, and wherein the bottom plate is located below a first bottom non-adjacent wiring layer adjacent to the second adjacent wiring layer, wherein the first bottom non-adjacent wiring layer is adjacent to the second adjacent wiring layer; and combining results of the first extraction and the second extraction to determine the extraction for the target wire; and modifying the circuit design based at least in part on result of performing the extraction.

2. The method of claim 1, further comprising, determining the cross-wiring density between the target wiring layer and the first adjacent wiring layer and between the target wiring layer and the second adjacent wiring layer independently; and performing the refinement method when the cross-wiring density has been determined to be below the density threshold.

3. The method of claim 2, further comprising, simultaneously performing the extraction and the refinement method based on the density threshold.

4. A processor system comprising a processor, computer implemented method for extracting a capacitance of an integrated circuit comprising a plurality of wiring layers including a least one of a plurality of wires on each plurality of wiring layers, the system comprises:

a memory;

receives, by a processor, a design of the integrated circuit having the plurality of wiring layers;

selects a target wire disposed on a target wiring layer from the plurality of wiring layers to perform capacitance extraction;

determines a first adjacent wiring layer and a second adjacent wiring layer, wherein the first adjacent wiring layer is disposed on a first side of the target wiring layer and the second adjacent wiring layer is disposed on a second side of the target wiring layer;

removes a first subset and a second subset of a plurality of non-adjacent wiring layers from the plurality of wiring layers to determine one or more vacant wiring layers, the first subset comprising one or more non-adjacent wiring layers disposed on the first side of the target wiring layer that the first adjacent wiring layer is disposed on and the second subset comprising one or more non-adjacent wiring layers disposed on the second side of the target wiring layer that the second adjacent wiring layer is disposed on;

approximates a first plate to be used in the extraction based on the first subset of the plurality of non-adjacent wiring layers and approximating a second plate to be used in the extraction based on the second subset of the plurality of non-adjacent wiring layers;

performs the extraction of the target wire based on the first and second adjacent wiring layers and the first and second plates;

wherein performing the extraction includes determining a cross-wiring density between the target wiring layer and the first adjacent wiring layer and between the target wiring layer and the second adjacent wiring layer, wherein at least one of the plurality of non-adjacent wiring layers is approximated as a plate based on the cross-wiring density;

determine the cross-wiring density is below a density threshold;

perform a refinement method based at least in part on determining the cross-wiring density is below the threshold, wherein the refinement method comprises:

perform a first extraction by removing the first subset and the second subset of the plurality of non-adjacent wiring layers, and approximating a top plate and a bottom plate for the first subset and second subset of the plurality of non-adjacent wiring layers respectively, wherein the top plate is located at a first non-adjacent wiring layer adjacent to the first adjacent wiring layer and the bottom plate is located at a first non-adjacent wiring layer adjacent to the second adjacent wiring layer;

perform a second extraction by removing the first subset and second subset of the plurality of non-adjacent wiring layers, and approximating a top plate and bottom plate for the first subset and second subset of the plurality of non-adjacent wiring layers respectively, wherein the top plate is located above a first top non-adjacent wiring layer, wherein the first top non-adjacent wiring layer is adjacent to the first adjacent wiring layer, and wherein the bottom plate is located below a first bottom non-adjacent wiring layer adjacent to the second adjacent wiring layer, wherein the first bottom non-adjacent wiring layer is adjacent to the second adjacent wiring layer; and combine results of the first extraction and the second extraction to determine the extraction for the target wire; and modify the circuit design based at least in part on result of performing the extraction.

5. The system of claim 4, further comprising, determining the cross-wiring density between the target wiring layer and the first adjacent wiring layer and between the target wiring layer and the second adjacent wiring layer independently; and performs the refinement method o when the cross-wiring density has been determined to be below the density threshold.

6. The system of claim 5, wherein the processor is further configured to simultaneously perform the extraction and the refinement method based on the density threshold.

7. A device for extracting a capacitance of an integrated circuit comprising a plurality of wiring layers including a least one of a plurality of wires on each plurality of wiring layers, the device comprises:

a memory coupled to a processor;

an interface, wherein the interface receives a design of the integrated circuit having the plurality of wiring layers;

selecting, by the processor, a target wire disposed on a target wiring layer from the plurality of wiring layers to perform capacitance extraction;

determining a first adjacent wiring layer and a second adjacent wiring layer, wherein the first adjacent wiring layer is disposed on a first side of the target wiring layer and the second adjacent wiring layer is disposed on a second side of the target wiring layer;

removing a first subset and a second subset of a plurality of non-adjacent wiring layers from the plurality of wiring layers to determine one or more vacant wiring layers, the first subset comprising one or more non-adjacent wiring layers disposed on the first side of the target wiring layer that the first adjacent wiring layer is disposed on and the second subset comprising one or more non-adjacent wiring layers disposed on the second side of the target wiring layer that the second adjacent wiring layer is disposed on;

approximating a first plate to be used in the extraction based on the first subset of the plurality of non-adjacent wiring layers and approximating a second plate to be used in the extraction based on the second subset of the plurality of non-adjacent wiring layers;

performing the extraction of the target wire based on the first and second adjacent wiring layers and the first and second plates;

wherein performing the extraction includes determining a cross-wiring density between the target wiring layer and the first adjacent wiring layer and between the target wiring layer and the second adjacent wiring layer, wherein at least one of the plurality of non-adjacent wiring layers is approximated as a plate based on the cross-wiring density;

determine the cross-wiring density is below a density threshold;

perform a refinement method based at least in part on determining the cross-wiring density is below the threshold, wherein the refinement method comprises:

perform a first extraction by removing the first subset and the second subset of the plurality of non-adjacent wiring layers, and approximating a top plate and a bottom plate for the first subset and second subset of the plurality of non-adjacent wiring layers respectively, wherein the top plate is located at a first non-adjacent wiring layer adjacent to the first adjacent wiring layer and the bottom plate is located at a first non-adjacent wiring layer adjacent to the second adjacent wiring layer;

perform a second extraction by removing the first subset and second subset of the plurality of non-adjacent wiring layers, and approximating a top plate and bottom plate for the first subset and second subset of the plurality of non-adjacent wiring layers respectively, wherein the top plate is located above a first top non-adjacent wiring layer, wherein the first top non-adjacent wiring layer is adjacent to the first adjacent wiring layer, and wherein the bottom plate is located below a first bottom non-adjacent wiring layer adjacent to the second adjacent wiring layer, wherein the first bottom non-adjacent wiring layer is adjacent to the second adjacent wiring layer; and combine results of the first extraction and the second extraction to determine the extraction for the target wire; and modify the circuit design based at least in part on result of performing the extraction.

8. The device of claim 7, further comprising, determining the cross-wiring density between the target wiring layer and the first adjacent wiring layer and between the target wiring layer and the second adjacent wiring layer independently; and performing the refinement method o when the cross-wiring density has been determined to be below the density threshold.

9. The device of claim 8, wherein the processor is further configured to simultaneously perform the extraction and the refinement method based on the density threshold.

* * * * *